(12) United States Patent
Heaton

(10) Patent No.: US 10,723,370 B1
(45) Date of Patent: Jul. 28, 2020

(54) SELF-DRIVING SINGLE-CAR TRAIN SYSTEM

(71) Applicant: Jeremiah Heaton, Abington, VA (US)

(72) Inventor: Jeremiah Heaton, Abington, VA (US)

( * ) Notice: Subject to any disclaimer, the term of this patent is extended or adjusted under 35 U.S.C. 154(b) by 0 days.

(21) Appl. No.: 16/705,805

(22) Filed: Dec. 6, 2019

(51) Int. Cl.
| | | |
|---|---|---|
| *B61D 15/00* | (2006.01) | |
| *B61C 13/00* | (2006.01) | |
| *B61L 27/04* | (2006.01) | |
| *B61D 47/00* | (2006.01) | |
| *B61D 3/18* | (2006.01) | |

(52) U.S. Cl.
CPC ............. *B61D 15/00* (2013.01); *B61C 13/00* (2013.01); *B61D 3/181* (2013.01); *B61D 47/005* (2013.01); *B61L 27/04* (2013.01)

(58) Field of Classification Search
CPC ..... B61C 3/00; B61C 3/02; B61C 5/00; B60F 1/00; B60F 1/043; B61D 17/00
See application file for complete search history.

(56) References Cited

U.S. PATENT DOCUMENTS

| | | | | |
|---|---|---|---|---|
| 3,678,864 A | * | 7/1972 | Gutridge | ................. B61C 17/04 |
| | | | | 105/4.1 |
| 2010/0114404 A1 | * | 5/2010 | Donnelly | ................. B61D 3/16 |
| | | | | 701/2 |

* cited by examiner

*Primary Examiner* — Robert J McCarry, Jr.
(74) *Attorney, Agent, or Firm* — Chambliss, Bahner & Stophel, P.C.

(57) ABSTRACT

A train system having a train element consisting of a single train car configured to travel along a rail system, and including an enclosed first use area and a flat car section. The flat car section includes a drive-on loading area configured to enable a vehicle to be driven onto the flat car section and then transported by the train car. Train element includes a drive system for moving the train element along the rail system and a control system for autonomously controlling the operation of the train car. A sensor system collects sensor data and provides the sensor data, as inputs, to the control system. Sensor data is used by the control system in operating the train car. Lastly, a power system independently powers the drive system and control system.

13 Claims, 7 Drawing Sheets

SELF-DRIVING SINGLE-CAR TRAIN SYSTEM

TECHNICAL FIELD

This invention relates generally to transportation by rail. More particularly, the invention relates to self-powered single train cars and a digitally-linked multi-train car system for autonomous commercial and passenger transport over an open rail network.

BACKGROUND OF THE INVENTION

Daily transportation of bulk cargo and people, while necessary, requires significant limited resources, including time, manpower, expense, and space. In many locations, a large percentage of the daily road traffic consists of local commuters. As cities grow, local traffic becomes an increasingly bigger concern that must be addressed. Adding to the problem of handling daily local traffic, roadways must also be equipped to handle non-local traffic that is passing through area or that is leaving or entering the area from a remote location. This would include, for example, transportation of goods via large trailers and also tourist traffic. This impacts certain areas more than others. Areas that are impacted by this type of traffic includes those having heavily-trafficked interstate exchanges, those with manufacturing facilities that require goods to be shipped into and out of the area, and areas with tourist locations.

A common response to these traffic problems is to expand the capacity of roadways (e.g., adding vehicle lanes, etc.). However, this solution is costly and requires significant planning and time to implement. Additionally, construction sites are dangerous and are a disruption to normal traffic patterns that often lasts for years. Other methods for alleviating traffic issues is to make roadways, vehicles and driving patterns more effective at responding to traffic. For example, certain cities have constructed special express lanes that are reserved for one group of vehicles (e.g., local traffic) while leaving standard roadways for other traffic (e.g., non-local/interstate traffic).

More recently, the idea of platooning vehicles has arisen as a possible solution for traffic issues. Vehicle platooning is a proposed method for partially or fully autonomously operating a group of road vehicles together, with narrow gaps provided between adjacent vehicles. Platooning is proposed to reduce fuel consumption, improve safety and traffic efficiency, etc. A number of vehicle platooning systems have been proposed, including Project SARTRE (Safe Road Trains for the Environment), which defines a platoon (or "road train") as a collection of electronically-linked "slave vehicles" that automatically follow a manually-driven heavy lead vehicle on conventional roadways. Another project, PATH, has focused on platooning fully automated heavy trucks in a close formation and in a dedicated lane of traffic in order to increase traffic capacity, reduce energy costs, and to improve safety. To be automated, many of these proposed systems require sophisticated sensor systems that provide both longitudinal control (i.e., controlling the distance between one vehicle and vehicles adjacent that vehicle) and lateral control (i.e., controlling the positioning of the vehicle within traffic lanes) of the vehicles. In other cases, extensive modifications or additions to the existing road surface are required (e.g., magnetic markers for use in the lateral control of vehicles, dedicated traffic lanes).

Finally, transportation of bulk cargo and people via rail has also been used in the past. Typically, trains are comprised of several train cars that are linked together and that hold cargo and passengers. These cars are pulled along train tracks by one or more locomotives. Transportation of cargo by rail is typically more fuel efficient and more economical than transportation of that cargo by road vehicle. This is particularly true when large cargo loads are transferred over long distances, but is not true for small loads or short distances. For this reason, transportation by rail is often reserved for long distance travel of large loads. A main disadvantage of rail transport is the lack of flexibility. Since trains are confined to travel on rails, trains may only be used to transport cargo and passengers where rails exist, whereas transport by road is highly flexible.

Another disadvantage of rail transport is that loading a train is time and labor intensive. For example, many goods transported from a factory are often initially loaded onto a truck at the factory by hand, transported to a rail yard on the truck, unloaded from the truck and then loaded onto the train by hand. To maximize cost and efficiency of the train, this process is repeated numerous times to prepare several train cars for simultaneous transport as part of a single train. However, before the train can depart, the train cars must then be organized and connected in a specific order. They are typically grouped based on their final destination, with train cars intended for the same final destination being connected together. At each of the final destinations, goods are, again, manually unloaded from the train car and loaded onto transport vehicles.

What is needed, therefore, is a system and method for transporting cargo and people that addresses the above issues.

NOTES ON CONSTRUCTION

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "connected" and "interconnected", refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiment thereof, and not to place a limitation on the scope of the invention. Nothing in the specification should be construed as indicating any element as essential to the practice of the invention unless so stated with specificity.

BRIEF SUMMARY OF THE INVENTION

The above and other needs are met by a train system that includes a train element consisting of a single train car configured to travel along a rail system. Each train element includes an enclosed first use area located at a first end of the train car and a flat car section. The flat car section includes a drive-on loading area located at a second end of the train car opposite the first use area. The loading area is configured to enable a vehicle to be driven onto the flat car section and then transported by the train car. The train elements also include a drive system configured to move the train element along the rail system and a control system configured to autonomously control the operation of the train car. A sensor system collects sensor data and provides the sensor data, as inputs, to the control system. The sensor data is used by the control system in operating the train car. Lastly, a power system independently powers the drive system and control system.

In certain embodiments, the train system includes two or more train elements that are configured to be digitally connected together to form a digital train. In some cases, a first one of the two or more train elements is a master train element that leads the other of the two or more train elements when the digital train is traveling along the rail system in a first direction. However, when the digital train is traveling along the rail system in a second direction, a second one of the two or more train elements is the master train element that leads the other of the two or more train elements. In certain preferred embodiments, the control system of the master train at least partially controls the speed and direction of the at least one slave train element. In some embodiments, each of the two or more train elements is provided with a unique identifier (e.g., a QR code) that is wirelessly detectable by the sensor system of the other of the two or more train elements within a predefined distance. In some embodiments, each of the two or more train elements travel along an open rail network and each train element may be separately programmed with a unique destination.

According to certain embodiments of the invention, the flat car section is enclosed. In certain embodiments, a second (preferably enclosed) use area is located between the first (preferably enclosed) use area and the flat car section. In some embodiments, the flat car section includes a first flat car section joined, at a articulating joint, to a second flat car section such that, when the flat car section travels along a straight portion of the rail system, longitudinal axes of the first flat car section and second flat car section are parallel with one another and, when the flat car section travels along a curved portion of the rail system, the flat car section flexes at the articulating joint such that the longitudinal axis of the first flat car section is not parallel with the longitudinal axis of the second flat car section. The flat car section of the train element may include a deck that is configured to rotate towards a rail of the rail system by an angle Θ to allow a vehicle to be driven onto the drive-on loading area from a side of the rail system. The angle Θ may be between 0° and 30°. In certain preferred embodiments, the first use area comprises an aerodynamic enclosed nosecone configured to house one or more passengers. In certain embodiments, there is provided a vehicle restraint for removably connecting a vehicle to the flat car section.

Additionally, the above and other needs are met by a method for operating train elements. The method includes the following steps: providing an open rail system and two or more of said train elements; providing a trip plan for each of the two or more train elements that includes instructions for traveling along the open rail system to a first destination; moving the two or more train elements, independently of one another, along a portion of the rail system; and autonomously coupling the two or more train elements together to form a digital train according to instructions provided by the trip plans. In certain cases, the digital train includes a master train element that leads the digital train and at least one slave train element following the master train element. In those cases, the master train element determines the speed and direction of each train element of the digital train.

In some cases, at least one of the two or more train elements is configured to travel along the rail system to an intended second destination after reaching the first destination. In certain of those cases, train elements automatically group into two separate groups that are joined together as a single platoon. The groups are preferably formed based on the first destination and second destination of the train elements, such that train elements having the same first and second destination form a platoon and are adjacent one another in the digital train.

In some embodiments, prior to the first destination, which first destination divides the portion of the rail system on which the digital train is traveling into two or more separate routes, including a first route and a second route, where the first route leads to the second destination of one of the at least two platoons and the second route leads to the second destination of a second of the at least two platoons, the digital train is decoupled to form two digital trains that each include one of the at least two platoons and that are each led by a different master train element. According to certain embodiments, the method further includes the step of forming substantially uniform couple gaps of a first length between each adjacent pair of train elements in the digital train. The method may further comprise forming a decouple gap having a second length between the two digital trains, wherein the second length is greater than the first length. In some embodiments, at least one of the first length and the second length are speed dependent.

In order to facilitate an understanding of the invention, the preferred embodiments of the invention, as well as the best mode known by the inventor for carrying out the invention, are illustrated in the drawings, and a detailed description thereof follows. It is not intended, however, that the invention be limited to the particular embodiments described or to use in connection with the apparatus illustrated herein. Therefore, the scope of the invention contemplated by the inventor includes all equivalents of the subject matter described herein, as well as various modifications and alternative embodiments such as would ordinarily occur to one skilled in the art to which the invention relates. The inventor expects skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiments of the invention are illustrated in the accompanying drawings, in which like reference numerals represent like parts throughout, and in which.

DETAILED DESCRIPTION OF THE INVENTION

This description of the preferred embodiments of the invention is intended to be read in connection with the accompanying drawings, which are to be considered part of the entire written description of this invention. The drawings are not necessarily to scale, and certain features of the invention may be shown exaggerated in scale or in somewhat schematic form in the interest of clarity and conciseness.

Figure 1:
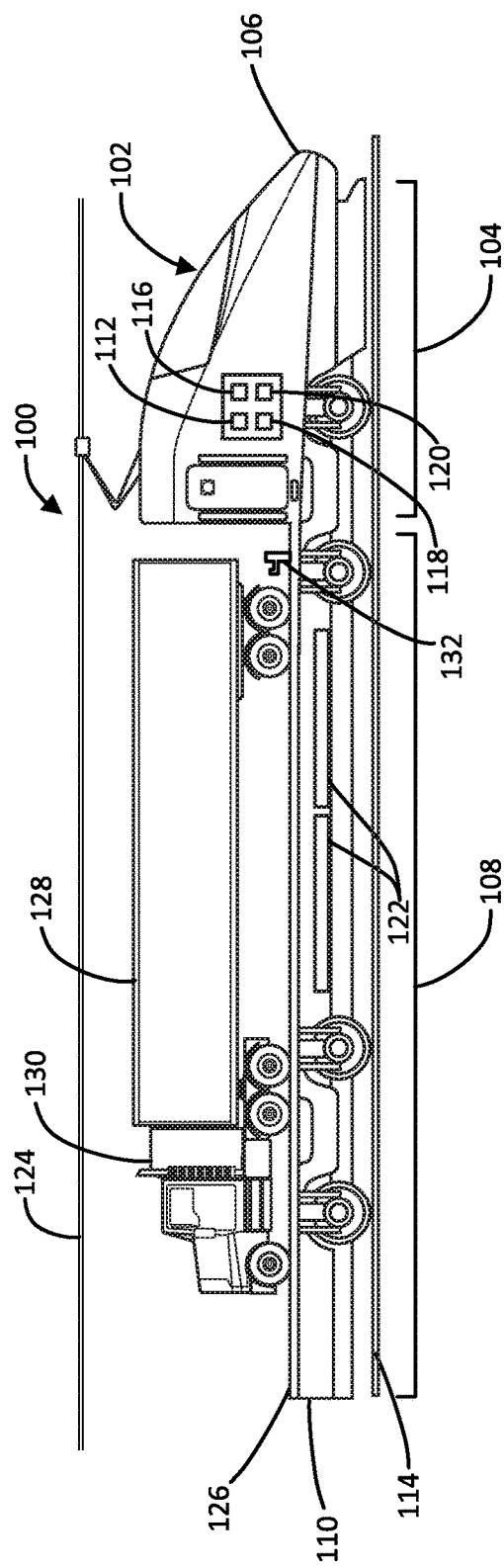
FIG. 1 is a side elevation view depicting a train car having a flat car section for trailer storage area according to a first embodiment of the present invention.

With initial reference to FIG. 1, there is provided a train system 100 according a first embodiment of the present invention. Train system 100 includes a train element that consists exclusively of a single train car 102, which train car includes a first use area 104 that is located at a first end 106 of the train car and a flat car section 108 that is located at a second end 110 of the train car opposite the first end. Train car 102 is preferably self-powered and self-directing and, therefore, is provided with a drive system 112 for moving the train along rails 114 and a control system 116 for providing at least partial automated control (i.e., computer control) of the train. In preferred embodiments, drive system 112 provides at least one means for driving the train car, which may include an all-electric drive system, a diesel drive system, or a hybrid drive system. Train car 102 is provided with a sensor system 118 that collects sensor data, which data is provided, as inputs, to the control system 116 for use in operating the train car as well as other train cars that are traveling with the train car, and that are digitally linked but not physically connected to the train car. A power system 120, which may include one or more electric motors, provides power to the wheels of the train car 102. In preferred embodiments, each train car 102 is self-powered and, therefore, is provided with its own independent power system 120. This may include, for example, batteries 122, diesel engine, etc. Batteries 122 may be recharged by a diesel engine/generator, power line (e.g., overhead line 124, third rail, etc.), regenerative braking, renewable energy sources (e.g., solar cell, wind turbine), etc.

Figure 2:
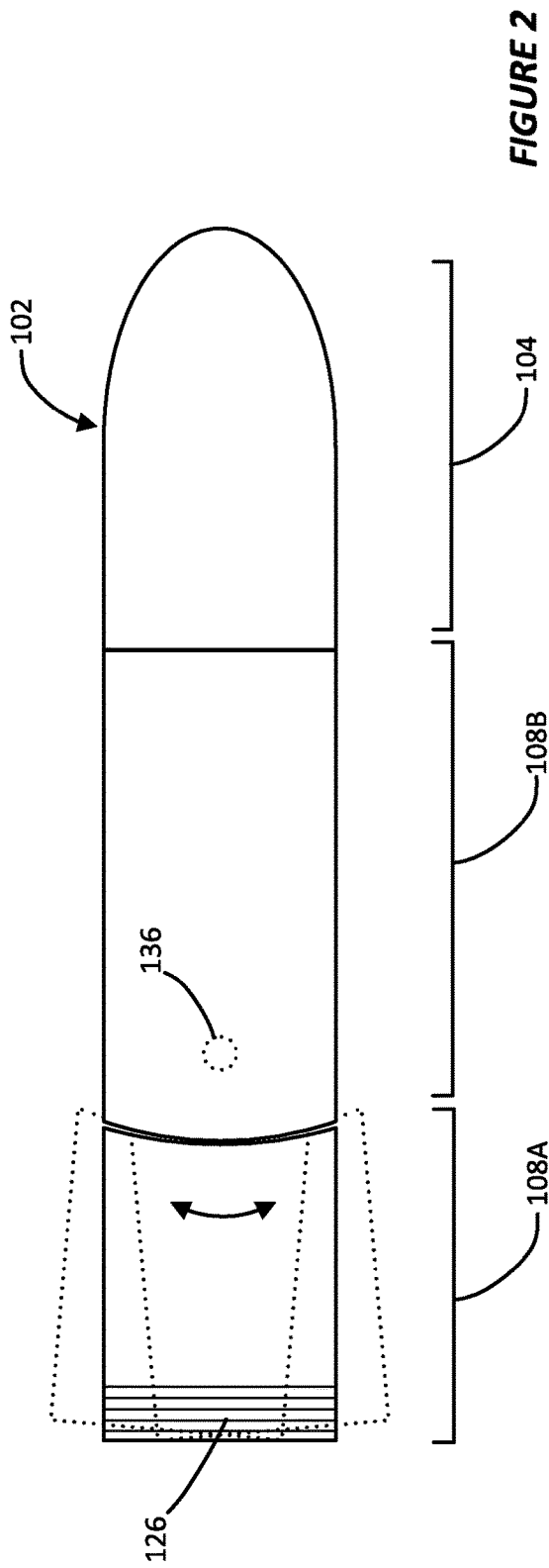
FIG. 2 is a top-plan view depicting a train car having an articulating flat car section according to a second embodiment of the present invention.

In preferred embodiments, flat car section 108 accommodates and stores commercial or passenger vehicles and may be enclosed or open. Flat car section 108 includes a drive-on loading area 126, such as an onboarding ramp, that enables a vehicle 128 to be driven directly onto and off of the train car 102. In certain preferred embodiments, flat car section 108 is sized and configured to receive a standard semi-trailer (i.e., a 53 foot trailer) separated from tractor unit 130 or while it is still attached to the tractor unit. In the embodiment of FIG. 1, the flat car section 108 is formed by a single continuous deck that is sized to allow an entire tractor-trailer to be driven onto the flat car section 108. However, as shown in FIG. 2, in other embodiments flat car section is divided into a first flat car section 108A and a second flat car section 108B that are joined together at an articulating joint 136. This articulating version of the flat car section enables the train car to be loaded with longer loads (e.g., tractor and 53 foot trailer) and for those loads to be carried on railways having tighter turning radii than would be possible without the articulating joint 136.

Figure 3:
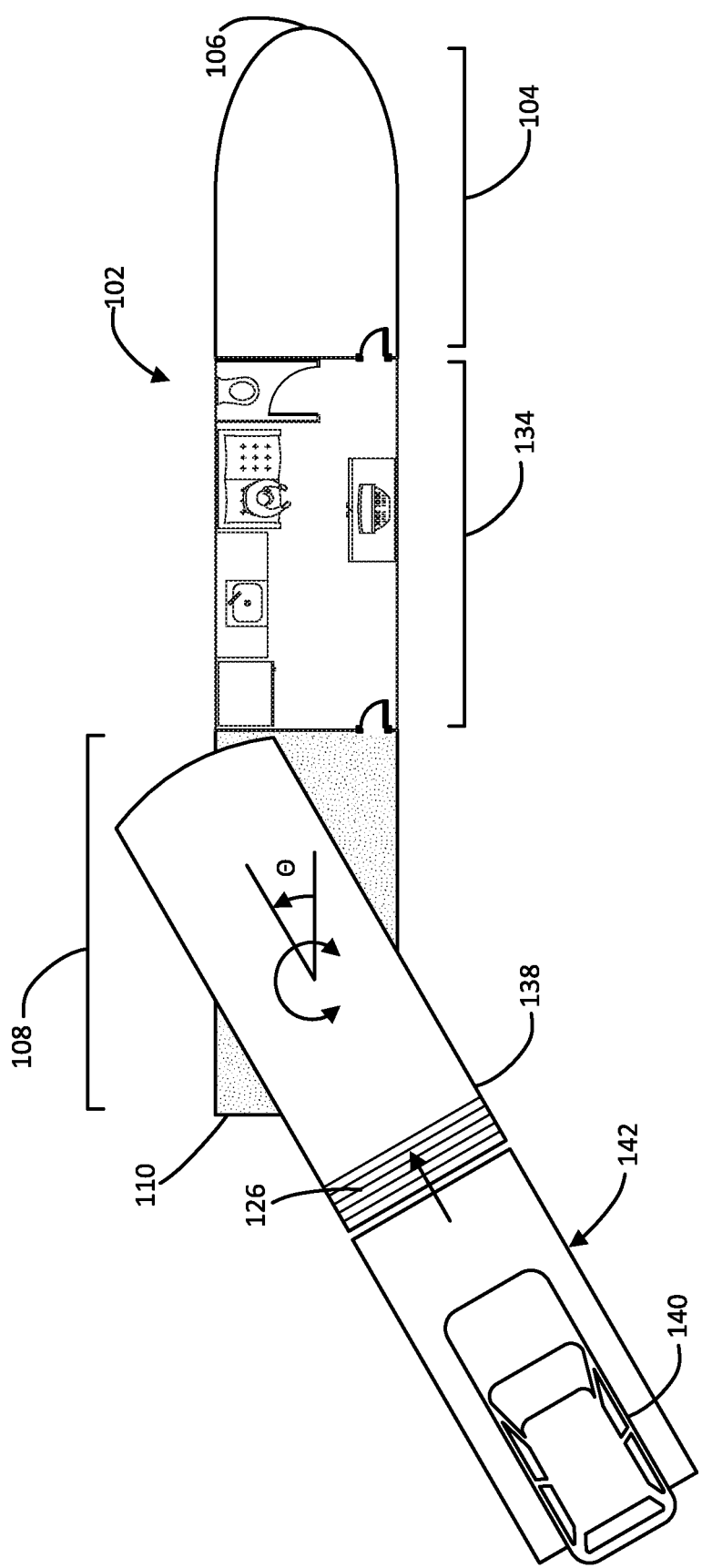
FIG. 3 is a top-plan view depicting a train car having a rotating flat car section according to a third embodiment of the present invention.

With reference to FIG. 3, wheeled vehicles 140 of all types may be driven directly onto the flat car section 108 via drive-on loading area 126. This may occur, for example via a ramp, sunken loading dock, or other suitable structure 142. Certain embodiments of the invention may be provided with a flat car section 108 having a rotating deck 138 that rotates by an angle $\Theta$ (with respect to a longitudinal axis of the train car 102), which is preferably between 0° and 30°, but could be as much as 90° or more) to facilitate vehicle 140 driving onto and off of the train car 102. Flat car section 108 may be provided with a bumper lock 132 (shown in FIG. 1), which engages a portion of the bumper or other portion of vehicle 128, 140 to secure the vehicle on the flat car section 108. In addition, in the case of semi-trailers 128, a selectively extendable fifth wheel (not shown) may be provided to engage a king pin of the trailer when the tractor unit is disconnected from the trailer. Other embodiments of the invention may include tire locks or straps, recessed areas formed in the top surface of the flat car section 108 for cradling tires of vehicles, moveable wheel chocks, and other similar devices for securing a vehicle to the flat car section.

First use area 104 is preferably located at a forward or head section of train car 102 and is formed as an aerodynamic (i.e., rounded) nosecone that may be configured as a mechanical area to hold equipment or as a passenger area to hold passengers. A train car 102 having a commercial-type first use area 104 is depicted in FIG. 1. The first use area 104 used in this application preferably has room for equipment, including the drive system 112, control system 116, sensor system 118, and power system 120 (or portions thereof), as well as limited personnel. A train car 102 having a passenger configuration that includes first use area 104, which is used exclusively as a mechanical room, as well as second use area 134, which is used for passengers, is depicted in FIG. 3. First and second use areas 104, 134 may be provided with sleeping bunks for one or more passengers, bathroom and shower facilities, entertainment amenities (e.g., television), and kitchen facilities. Other features may include onboard water supplies and storage tanks (e.g., hot, grey, black water), water purification, and other convenience features such as power inverter for providing AC power, wireless internet access, etc.

In use, the single train car 102 may be loaded with a vehicle (e.g., trailer 128 and tractor unit 130, shown in FIG. 1; or passenger vehicle 140, shown in FIG. 3) by driving the vehicle directly onto the flat car section 108 via drive-on loading area 126. Occupants of the vehicle may remain on the train car 102 in either of the first or second use areas 104, 134. This would enable a family, for example, to transport their vehicle with them as they travel by train car. The use areas 104, 134 could also be occupied by operators of a commercial vehicle (e.g. drivers of tractor trailers) or operators of the train car 102. However, as briefly discussed above and as further detailed below, it is preferable that the train car 102 be fully self-powered and self-operated via computer controls such that limited or no input from an operator, located onboard or remote, is required for train car 102 to be transported.

In preferred embodiments, each single train car 102 of the present invention is capable of operating independently and physically decoupled from all other train cars. Advantageously, the self-powered and self-controlled train car 102 of the present invention enables the train car to travel to its destination as soon as the vehicle, shipment, etc. has been loaded onto the flat car section 108. This, therefore, avoids the delays and costs associated with waiting for multiple train cars to be prepared, arranging those train cars into a particular order, and then transporting all of the train cars at the same time. Instead, as soon as a single train car 102 is loaded, it may depart to its intended destination. As further described below, during that transport process, train cars 102 that are traveling in the same direction may be temporarily digitally linked together to form a digital platoon or a digital train, where the train cars of the train may share resources or information, may offload certain guidance functions to other train cars within the train in order to reduce energy usage, and may arrange themselves in close proximity to one another to reduce drag on each of the cars in the platoon and to make the train more energy efficient.

Figure 4:
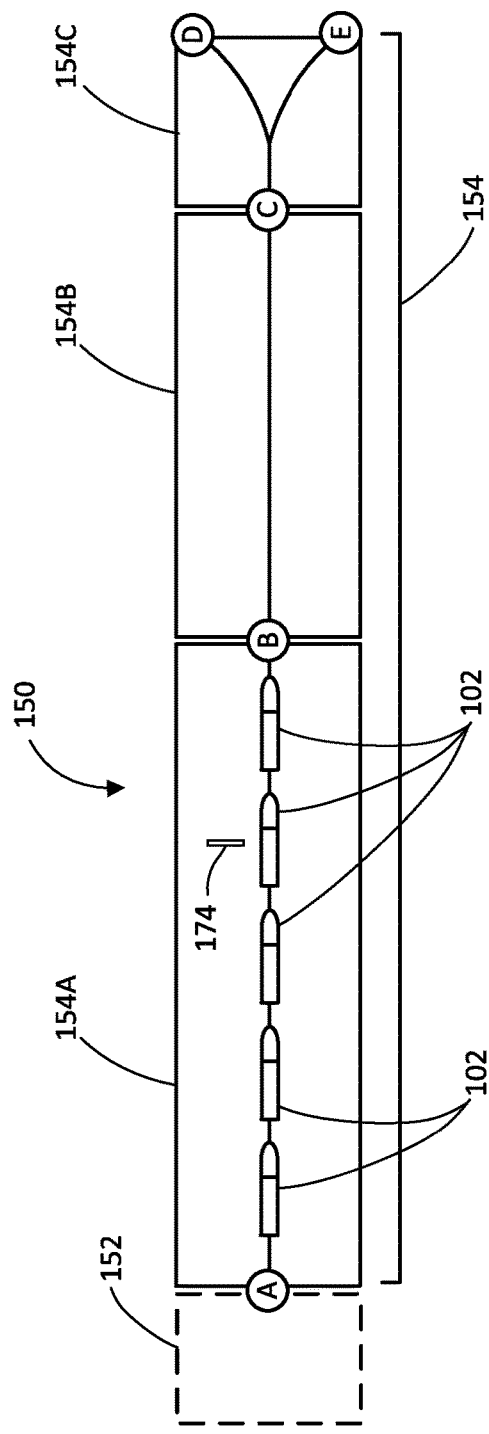
FIGS. 4 and 5 depict a rail system having controlled portions and open portions according to an embodiment of the present invention.
Figure 5:
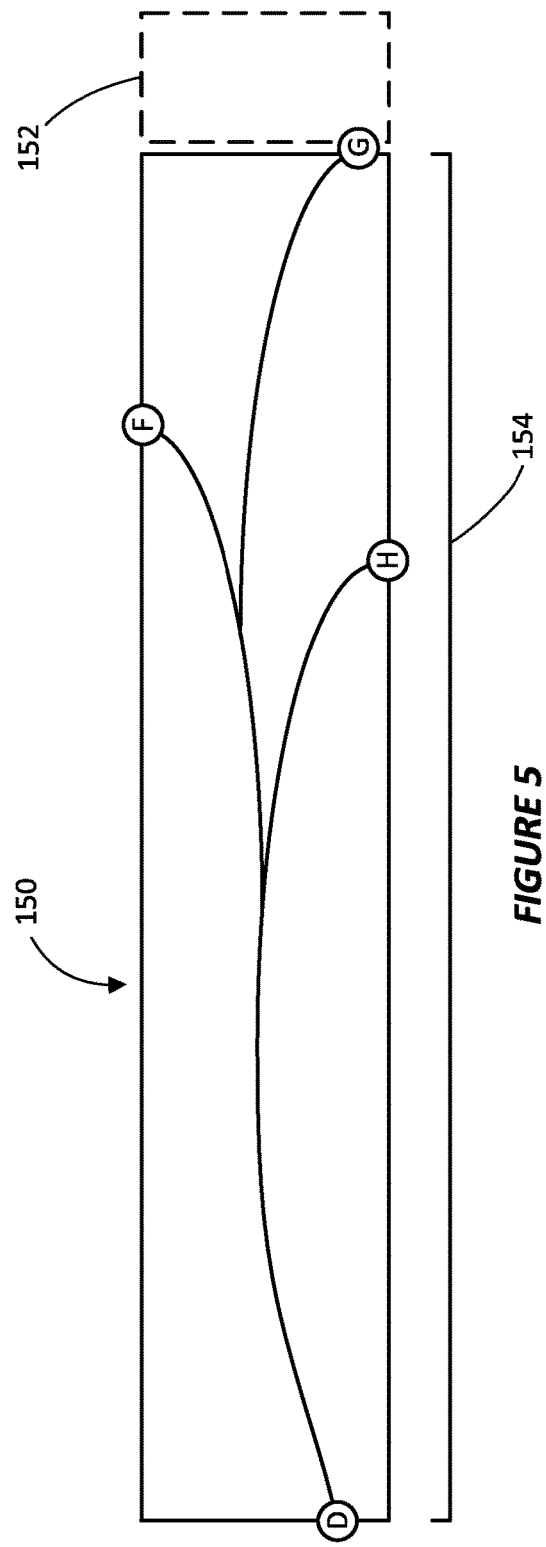
Figure 6:
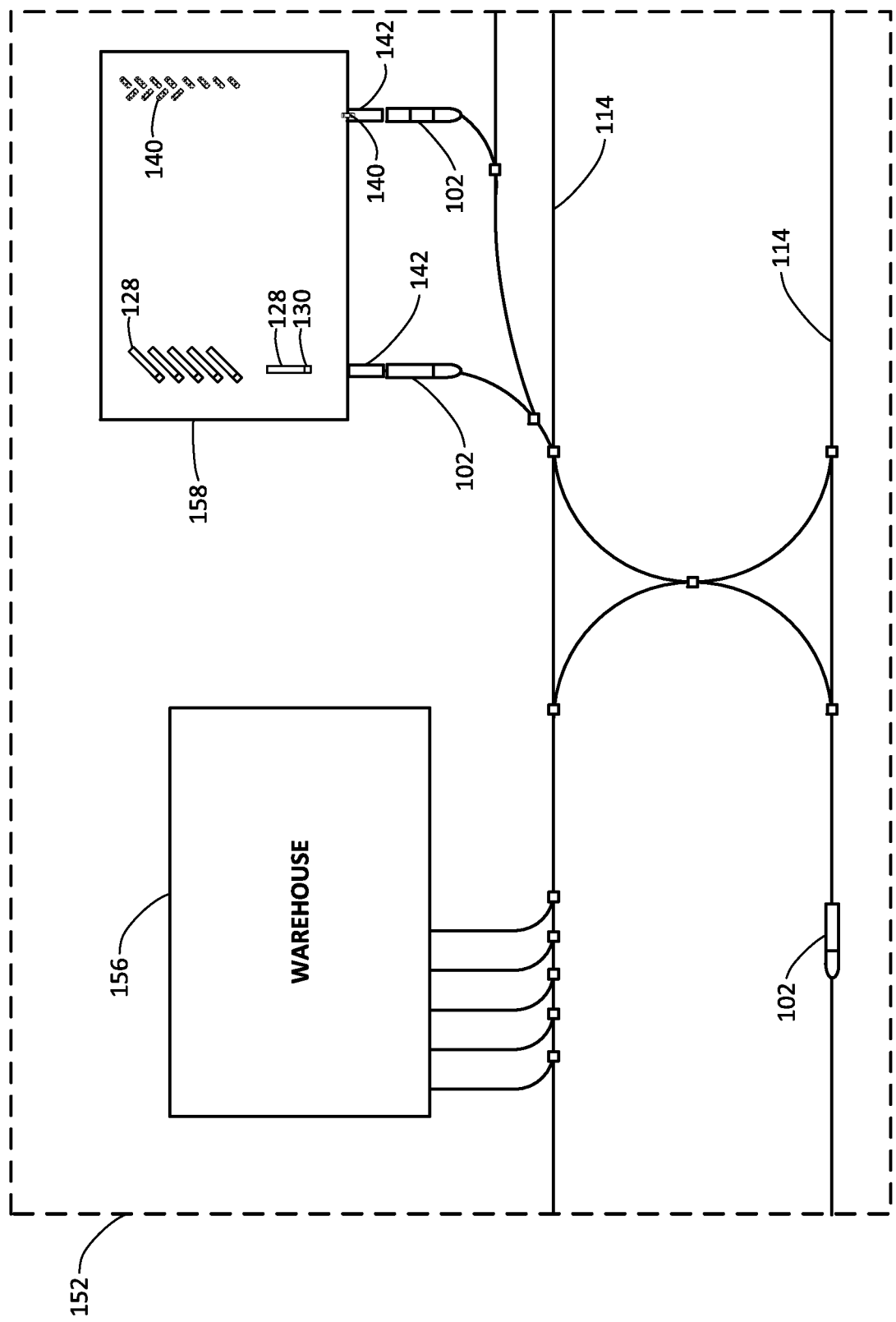
FIG. 6 depicts a controlled portion of a rail network according to an embodiment of the present invention.

With reference to FIGS. 4 and 5, there is a shown a rail network 150 according to an embodiment of the present invention that includes controlled portions 152 and open portions 154. Controlled portions 152 are relatively small sections of the rail network 150, where train cars 102 are generally carefully controlled and are generally moved short distances at slow speeds, including, for example, loading and unloading areas, train stations, etc. An exemplary controlled portion 152 is provided in FIG. 6. The illustrated controlled portion 152 includes a warehouse 156, etc., where goods may be received or shipped from on train cars 102. Goods may also be first loaded onto trailers 128 and hauled by tractors 130 onto train cars 102 for transport. These trailers 128 may be stored with or without the truck 130 in storage area 158. Similarly, passenger vehicles 140 may also be driven onto train cars 102 via ramps 142 (or other similar loading devices, including sunken loading docks) located at storage area 158 or warehouse 156 (which could include, for example, a parking garage, etc.).

On the other hand, with reference again to FIGS. 4 and 5, open portions 154 are longer sections of the rail network 150, found between controlled portions 152, where train cars 102 travel long distances at high speeds. The phrase "open rail network" and the term "open", when used to describe a portion of a rail network, exclude closed rail loops or portions of a rail network where the route taken by the train car 102 is static and is not customizable or cannot be altered from one trip to the next trip. In preferred embodiments, train cars 102 may be partially or fully controlled by an operator in the controlled portions 152 of the rail network 150. However, upon exiting the controlled portion 152, train cars 102 are preferably fully autonomous in the open portions 154 of the rail network 150. Train cars 102 and rail network 150 are preferably provided with geo-fencing functionality (illustrated by dashed and solid boxes), other location detection capabilities (such as gates "A", "B", "C", etc.), etc. to alert operators, either onboard the train cars or remote from the train cars, when a train car is entering or leaving a controlled portion 152, an open portion 154, or sub-section (e.g., 154A, 154B, 154C) of a controlled or open portion of the rail network.

While each train car 102 is capable of traveling to its destination by itself, there are certain advantages in multiple train cars traveling together along the rail network 150 together, including maximizing space on the rail network. For this reason, in preferred embodiments, train cars 102 are configured to join together to form a digitally- but not physically-linked train. As the term is used throughout this description, a digitally-linked train or, more simply, a "digital train" refers to a collection or grouping of self-powered single train cars 102 that are not in physical contact with one another but that are, at least temporarily, simultaneously traveling together along a section of the rail network 150 at a substantially uniform speed and with a substantially uniform spacing between each adjacent pair of train cars. Digitally linking train cars 102 eliminates the time and expense of waiting for a full train of train cars to be loaded and prepared for shipment and also eliminates the time and expensive of ordering train cars and then coupling them together.

Figure 7:
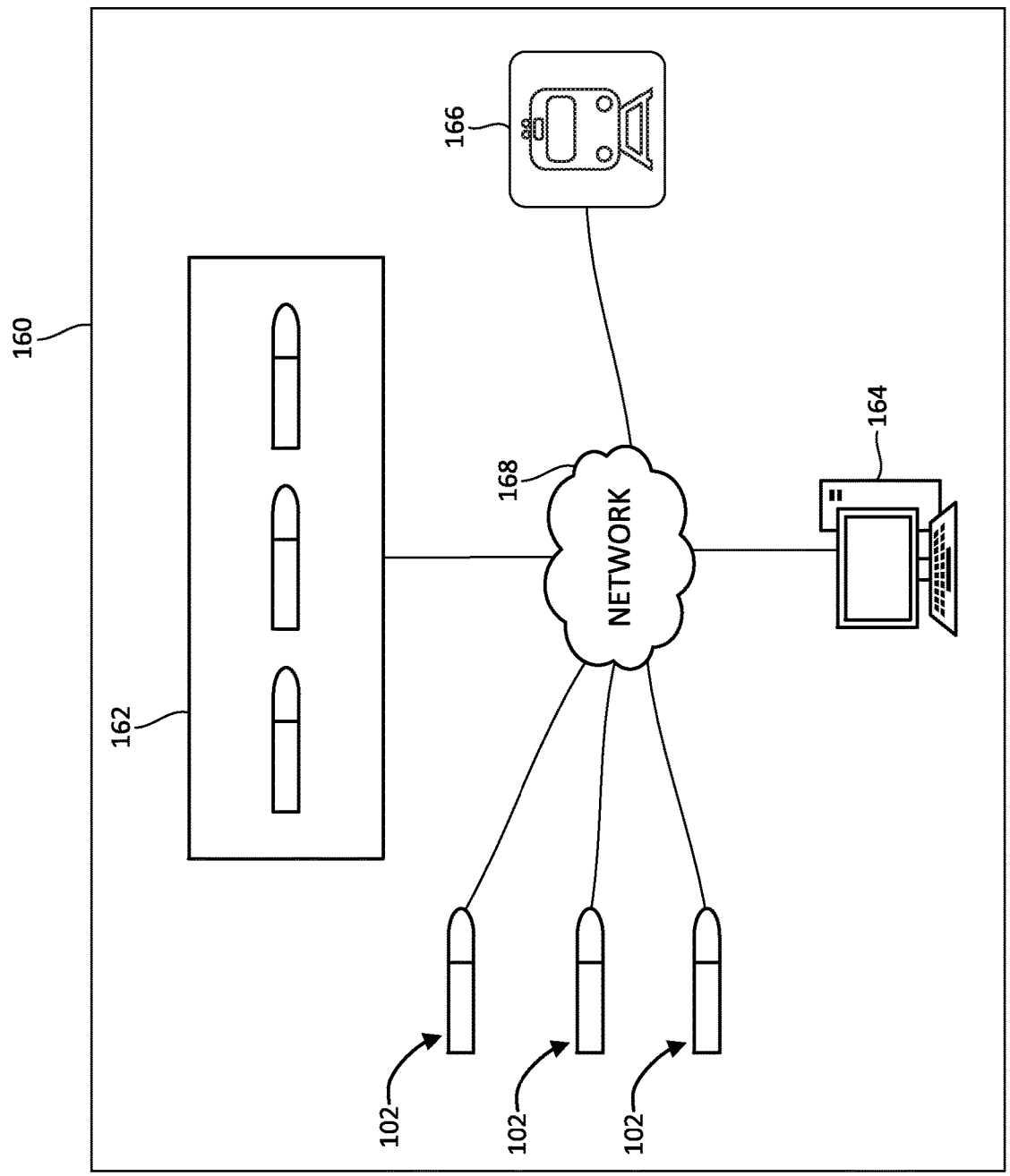
FIG. 7 depicts a remote control train system according to an embodiment of the present invention.

With reference to FIG. 7, there is provided a remote train control system 160 for (sometimes but not necessarily) working jointly with onboard control system 116 (FIG. 1) to fully or partially controlling individual train cars 102 and digital trains 162 formed by two or more digitally-connected train cars according to an embodiment of the present invention. In preferred embodiments, control system 160 includes one or more computer systems 164 that communicate with one another and with train cars 102, rail networks 150, digital trains 162, conventional trains 166 over a network 168 (e.g., Internet, intranet, extranet, cellular, Wi-Fi, etc.). Preferably, all communication over network 168 is encrypted.

Control system 160 preferably provides information over network 168, such as current speed and location data as well as destination information, about train cars 102 and trains 162, 166 to other train cars and trains, which enables the train cars and trains to coordinate with one another in order to operate on the same rail network 150. For example, using the information obtained from train control system 160, train cars 102 can plan routes to their destination (i.e., Trip Plans) that avoid conflicts with other train cars or trains 162, 166 that are located on the same rail network 150 but that are traveling in the opposite direction or at a different speed. In another example, using the information obtained from train control system 160, train cars 102 can identify and seek out other train cars that are traveling in the same direction, and join those train cars to form a platoon.

In preferred embodiments, train cars 102 are provided with a sensor system 118 that includes visual and proximity detectors (e.g., laser, camera, etc.) for scanning and identifying hazards along the railway. Control system 116 is preferably configured to automatically respond to these hazards. Sensor system 118 is also configured to scan and identify other train cars. Sensor system 118 is preferably configured to detect distance and speed of train cars in its proximity. Providing this information to control system 116 enables train cars 102 to match the speed, direction, braking, etc. of other train cars in order to form and operate as a platoon. Preferably, control and sensor systems 116, 118 are configured to read signage or other indicia 174 (FIG. 4) on other train cars 102 (e.g., identifying QR codes) or in proximity to the rails 114 for identifying information about the rail system 150 and about other train cars 102. Indicial may include, for example, directional or speed control signs, grade information, turn radius information, location signage, etc. Using this information as an input, control system 116 is preferably configured to automatically and safely guide train car 102 towards the intended destination and, where appropriate, join and leave platoons of other train cars.

Figure 8:
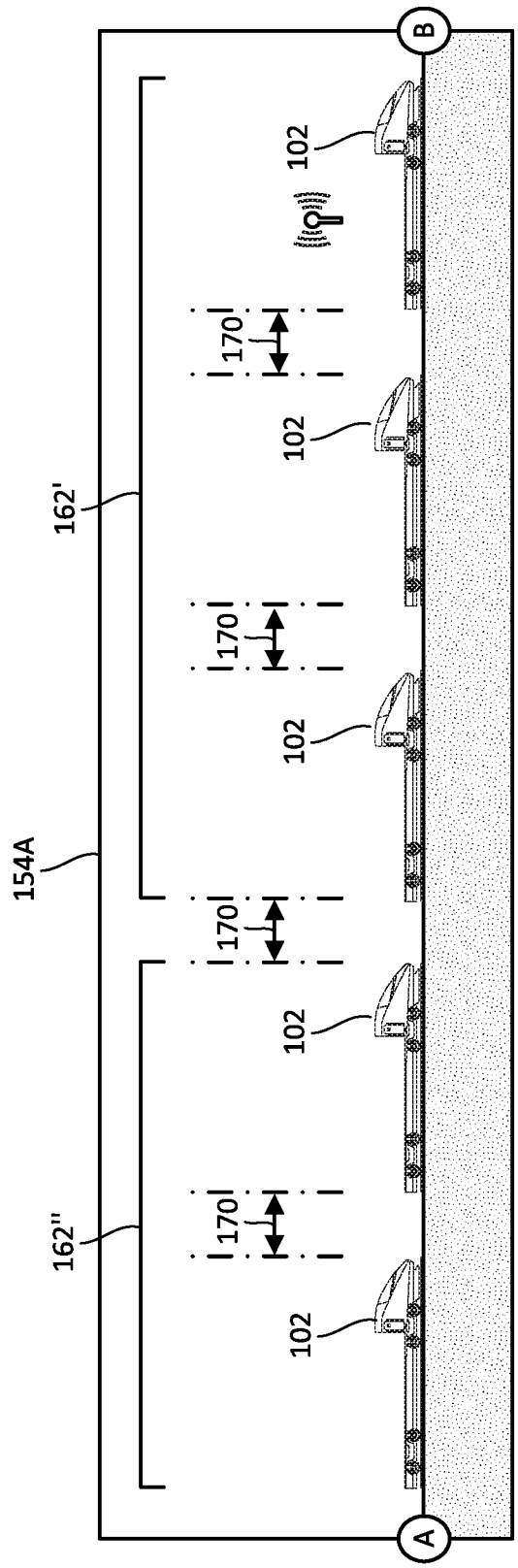
FIG. 8 depicts a digital train formed by two platoons operating in a commuting mode.
Figure 9:
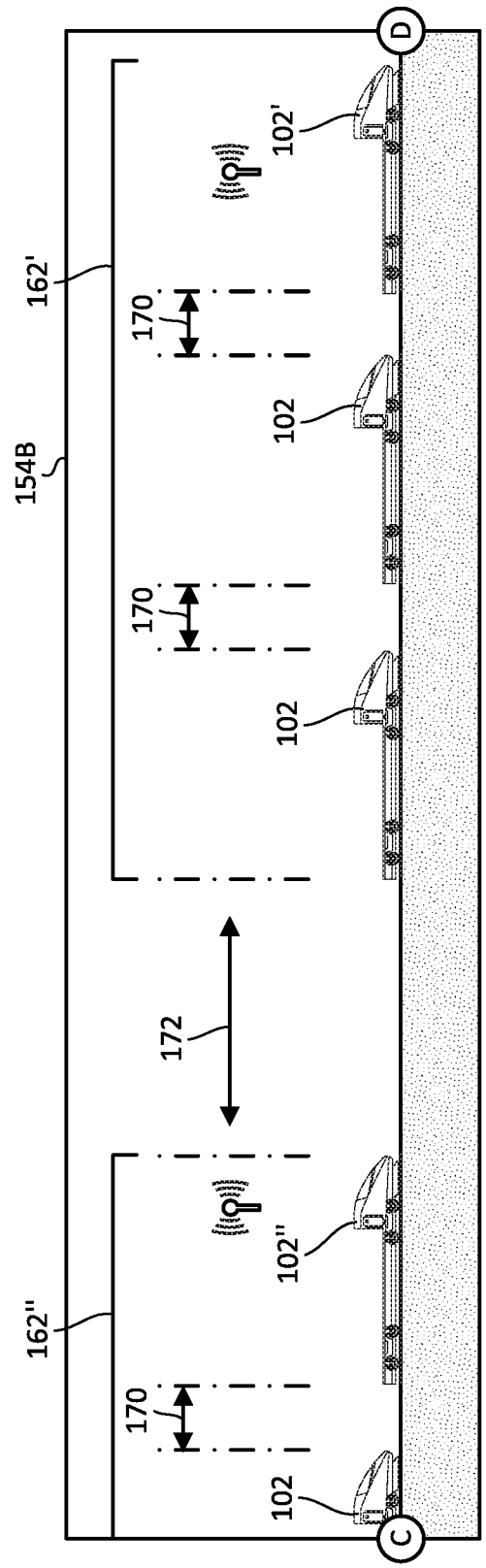
FIG. 9 depicts the digital train of FIG. 8 operating in a decoupling mode.
Figure 10:
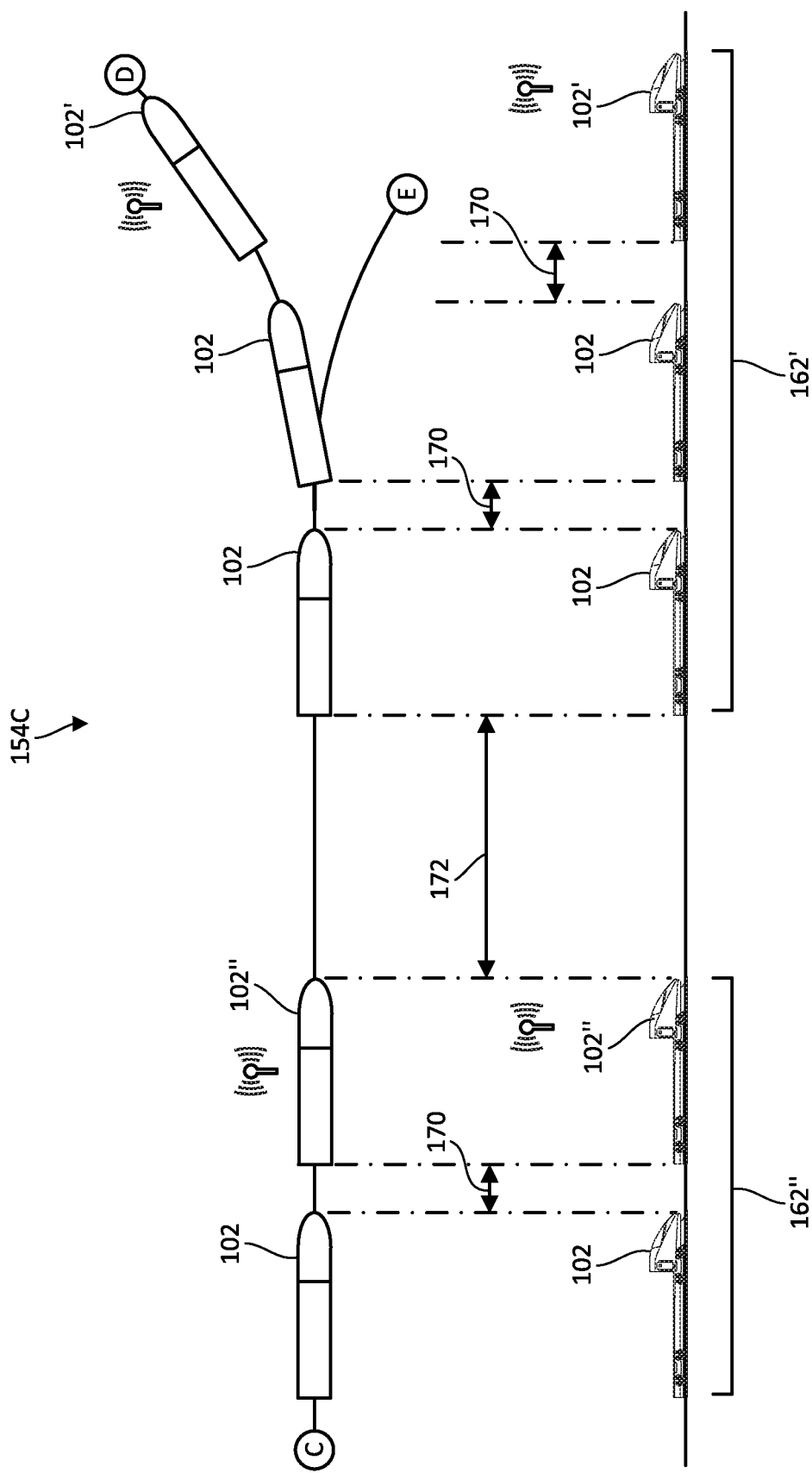
FIG. 10 depicts the digital train of FIG. 8 operating in a separation mode at a diverging junction.

Referring again to FIGS. 4 and 5 and with further reference to FIGS. 8-10, several individual train cars 102 are shown traveling in the same direction along open portion 154 as a platoon 162. Preferably, when a platoon 162 is formed, individual train cars 102 are automatically grouped or positioned within the platoon based on their intended destination. For example, in this particular embodiment, the first three train cars 102 in the platoon 162 (the rightmost three train cars shown in FIG. 4) are traveling to Gates B, C, and D and are grouped as first sub-platoon 162' (FIG. 8). After passing through Gate D, the three train cars 102 will separate from one another and continue traveling, individually, to Gates F, G, and H. However, since the train cars 102 are all initially bound for Gate D, they are grouped into the first sub-platoon 162' within platoon 162. The fourth and fifth train cars of the platoon 162 (the leftmost two cars shown in FIG. 4) are also traveling to Gates B and C, but are traveling to Gate E instead of Gate D, as second sub-platoon 162" (FIG. 8). Since these train cars 102 are each initially traveling to Gate C, they are grouped. However, since they are bound for Gate E instead of Gate D, they are placed into second sub-platoon 162". It may be appreciated that further sub-platoons or even sub-platoons within sub-platoons may be created, based on the destinations of each of the constituent train cars 102 of the platoon 162.

Preferably, when a platoon 162 is formed, the leading train car 102 functions as a "master" train car and those train cars that follow the master train car are "slave" train cars. The master train car 102 wirelessly (e.g., via a two-way 3G/4G/5G cellular network) provides information to the slave train cars and, preferably, controls (i.e., partially or fully) the speed and direction of the slave train cars. The slave train cars 102 also provide information to each other and to the master train car via a wireless or cellular network. The designation of a train car 102 as a "master" or "slave" may change under several circumstances. For example, if the platoon 162 is traveling in one direction, the leading train car 102 would function as the master train car followed by slave cars. However, if the platoon 162 were to change direction (i.e., travel in reverse), the rearmost train car 102 could be configured to function as the master train car.

Preferably, to reduce energy usage of the platoon 162, the sensor systems 118 of the slave train cars 102 are partially or fully disengaged once a master train car has taken control of the platoon. Instead, the platoon 162 relies on the sensor system 118 of the master train car 102 to make observations (e.g., forward-facing and rear-facing observations) and then, based on those observations, to make speed, direction, and other decisions for all of the train cars in the platoon. For example, if a hazard is observed on an upcoming portion of the rails 114 by the sensor system 118 of the master train car 102, the control system 116 of the master train car may be configured to automatically respond to that hazard (e.g., by slowing down, stopping, etc.) and to cause each of the slave train cars to respond in a similar manner. In another example, the sensor system 118 of the master train car 102 may observe signage for a location, junction, etc. and then, in response to that information, the control system 116 makes an appropriate response (e.g., turn left, turn right) that is based on the destination of the train car. In some embodiments, the observations by the sensor system 118 of the master train car 102 is wirelessly transmitted to a trailing train car (e.g., the immediate next train car in the platoon behind the master train car) and then that control system 116 of that trailing train car makes any necessary adjustments for that train car alone. The information may be sent rearwards, train car by train car, through the platoon 162.

To further reduce energy usage of the platoon 162, when forming a platoon 162, train cars 102 are preferably spaced closely to one another to provide a first gap 170 between each adjacent train car, such that the platoon resembles a conventional train formed by physically-connected train cars. Preferably, first gap 170 is between 3-20 feet. Spacing adjacent train cars 102 closely together in the platoon 162 reduces drag on each of the train cars following the leading train car. Similarly, to increase safety, a minimum second gap 172 is preferably provided between each adjacent platoon 162. By providing this minimum second gap 172, a platoon 162 would have a sufficient amount of time to observe a problem ahead (e.g., an accident involving the platoon ahead) and to respond. Preferably, second gap 172 is at least 600 feet. Advantageously, since train cars 102 are not physically connected to one another, a much shorter stopping distance is required to stop them compared to a typical freight train, which can average ½ mile (approximately 2,500 feet).

As the number and configuration of platoons 162 changes, different train cars 102 within those platoons may operate as the master train car. If a single platoon 162 were to be divided into two separate platoons, a second leading train car 102 would be designated as the master train car of the second platoon and the original leading train car would remain the master train car of the first platoon. This process is illustrated in FIGS. 4 and 8-10. As shown in FIGS. 4 and 8, open section 154 includes a first section 154A, where the platoon 162 is operating in a commuting mode. Commuting mode is the standard mode of operation of a platoon 162, where each train car 102 is separated from each adjacent train car by first gap 170. The train cars 102 are preferably traveling at approximately the same speed and are partially or fully controlled by a leading master train car (denoted by a beacon symbol).

In general, platoons 162 operate in commuting mode for the majority of the trip. However, as train cars 102 enter or leave the platoon, the platoon is reconfigured. For example, as a platoon approaches a diverging junction point, where one sub-platoon (or even a single train car) is traveling in one direction (e.g., North) and another sub-platoon (or single train car) is traveling in another direction (e.g., South), it is necessary to decouple the platoon. This process is shown in FIGS. 4, 9, and 10, where rail network 150 includes decoupling section 154B and a separation section 154C. At decoupling section 154B, sub-platoon 162" is decoupled from sub-platoon 162' to provide a second gap 172 between them. The leading train car 102 of each is designated as the master train car and controls each respective sub-platoon. In separation section 154C, sub-platoon 162' is guided towards Gate D by master train car 102' at the diverging junction. Later, sub-platoon 162" is guided towards Gate E by master train car 102" at the diverging junction.

In preferred embodiments, train cars 102 are each configured to engage a "Trip Plan" that includes a list of instructions for directing the train car to a destination. Preferably, Trip Plans are based, in part, on the information provided by the control system 160 as well as new information obtained during the trip, including updated information provided by the control system and also new information obtained from the on-board sensor system 118. When platooning, trip plans for each may also be updated based on information obtained by other train cars in the platoon. Accordingly, Trip Plans are preferably not static, but may be updated as necessary to account for new information (e.g., updated destination, new platooning opportunity), operating conditions (e.g., wildlife, weather, and other hazards), etc. In preferred embodiments, a secure log (e.g., a log utilizing distributed ledger/block chain technology) catalogs the location of each train car 102 and may include a running log of its movements. For example, an entry may be made in the log every time a train car has met or has failed to meet an objective or step in the Trip Plan, every time the Trip Plan is updated, etc.

Below is an example Trip Plan for a train car named "ABC":

Step 1. Depart Dock A1 heading South at 9:35 AM.
Step 2. Accelerate and maintain 37 mph for 22 minutes.
Step 3. Switch to southbound rail at "1234" junction.
Step 4. Accelerate and maintain 45 mph for 12 minutes.
Step 5. Stop at gate 12 for 7 minutes to allow passage of conventional train unit.
Step 6. At all clear—Accelerate and maintain 55 mph for 20 minutes.
Step 7. Intercept and establish digital link to train car "XYZ".
Step 8. Accept control of train car XYZ as Master train car.
Step 9. Intercept and establish digital link to Master train car "EFG".
Step 10. Release control of train car ABC and XYZ to Master train car EFG.
Step 11. Follow Master train car EFG for 1,345 miles to Pendleton, Oreg.
Step 12. Re-engage individual control and control of train car XYZ.
Step 13. Accelerate and maintain 45 mph for 23 minutes.
Step 14. Decelerate to 5 mph.
Step 15. Park at Dock 12 at 1:12 AM.

Although this description contains many specifics, these should not be construed as limiting the scope of the invention but as merely providing illustrations of some of the presently preferred embodiments thereof, as well as the best mode contemplated by the inventor of carrying out the invention. The invention, as described and claimed herein, is susceptible to various modifications and adaptations as would be appreciated by those having ordinary skill in the art to which the invention relates.

What is claimed is:

1. A train system comprising:
    a train element consisting of a single train car configured to travel along a rail system, the train element including:
        an enclosed first use area located at a first end of the train car;
        a flat car section, including a drive-on loading area that is configured to enable a vehicle to be driven onto and transported, located at a second end of the train car opposite the first use area;
    a drive system configured to move the train element along the rail system;
    a control system configured to autonomously control the operation of the train car;
    a sensor system configured to collect sensor data and to provide sensor data, as inputs, to the control system that are used by the control system in operating the train car;
    a power system for independently powering the drive system and control system.

2. The train system of claim 1 further comprising two or more train elements configured to be digitally connected together to form a digital train, wherein, when formed as the digital train, the two or more train cars are not in physical contact with one another and travel together along a section of a railway at a substantially uniform speed and with a substantially uniform spacing between each adjacent pair of train elements.

3. The train system of claim 2 wherein a first one of the two or more train elements is a master train element that leads the other of the two or more train elements when the digital train is traveling along the rail system in a first direction and a second one of the two or more train elements is the master train element that leads the other of the two or more train elements when the digital train is traveling along the rail system in a second direction.

4. The train system of claim 3 wherein the control system of the master train at least partially controls the speed and direction of the at least one slave train element.

5. The train system of claim 2 wherein each of the two or more train elements is provided with a unique identifier that is wirelessly detectable by the sensor system of the other of the two or more train elements within a predefined distance.

6. The train system of claim 2 wherein each of the two or more train elements are configured to travel along an open rail network and wherein each train element may be separately programmed with a unique destination.

7. The train system of claim 1 wherein the flat car section is enclosed.

8. The train system of claim 1 further comprising second use area located between the first use area and the flat car section.

9. The train system of claim 1 wherein the flat car section comprises a first flat car section joined, at a articulating joint, to a second flat car section such that, when the flat car section travels along a straight portion of the rail system, longitudinal axes of the first flat car section and second flat car section are parallel with one another and, when the flat car section travels along a curved portion of the rail system, the flat car section flexes at the articulating joint such that the longitudinal axis of the first flat car section is not parallel with the longitudinal axis of the second flat car section.

10. The train system of claim 1 wherein the flat car section of the train element comprises a deck that is configured to rotate towards a rail of the rail system by an angle Θ to allow a vehicle to be driven onto the drive-on loading area from a side of the rail system.

11. The train system of claim 10 wherein angle Θ is between 0° and 30°.

12. The train system of claim 1 wherein the first use area comprises an aerodynamic enclosed nosecone configured to house one or more passengers.

13. The train system of claim 1 further comprising a vehicle restraint for removably connecting a vehicle to the flat car section.

* * * * *